US009824580B2

United States Patent
Dong et al.

(10) Patent No.: US 9,824,580 B2
(45) Date of Patent: Nov. 21, 2017

(54) METHOD, COMPUTER READABLE STORAGE MEDIUM AND SYSTEM FOR PRODUCING AN UNCERTAINTY-BASED TRAFFIC CONGESTION INDEX

(71) Applicant: International Business Machines Corporation, Armonk, NY (US)

(72) Inventors: Wei Shan Dong, Beijing (CN); Ning Duan, Beijing (CN); Peng Gao, Beijing (CN); Guo Qiang Hu, Shanghai (CN); Chang Sheng Li, Beijing (CN); Xin Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/972,621

(22) Filed: Dec. 17, 2015

(65) Prior Publication Data

US 2017/0178499 A1    Jun. 22, 2017

(51) Int. Cl.
  *G08G 1/01* (2006.01)
  *G01C 21/30* (2006.01)
  *B60W 40/04* (2006.01)

(52) U.S. Cl.
  CPC ........... *G08G 1/0125* (2013.01); *G01C 21/30* (2013.01); *G08G 1/0133* (2013.01); *B60W 40/04* (2013.01)

(58) Field of Classification Search
  CPC ... G08G 1/0133; G08G 1/0125; B60W 40/04; G01C 21/3492
  See application file for complete search history.

(56) References Cited

U.S. PATENT DOCUMENTS

2013/0103295 A1* 4/2013 Koshizen .............. B60W 30/16
                                                  701/119
2013/0204525 A1* 8/2013 Pfeifle ................ G08G 1/09626
                                                  701/533
(Continued)

FOREIGN PATENT DOCUMENTS

CN    103280098 A    9/2013
CN    103366557 A    10/2013

OTHER PUBLICATIONS

Hoh, B. et al., "Achieving Guaranteed Anonymity in GPS Traces via Uncertainty-Aware Path Cloaking", IEEE Transactions on Mobile Computing, (Aug. 2010), vol. 9, No. 8, pp. 1089-1107.

*Primary Examiner* — Thomas Ingram
(74) *Attorney, Agent, or Firm* — Scully, Scott, Murphy & Presser, P.C.; Keivan Razavi, Esq.

(57) ABSTRACT

Provided is a mechanism for producing an uncertainty-based traffic congestion index, wherein the mechanism may comprise: obtaining a plurality of GPS data points; dividing the plurality of GPS data points into a plurality of variable sliding windows, wherein the dividing maximizes an amount of shape information in each of the plurality of variable sliding windows, performing a map matching process on the plurality of GPS data points as the GPS data points had been divided by the dividing; calculating a confidence value indicative of the map matching process; and producing the traffic congestion index, wherein the traffic congestion index is produced by taking into account the calculated confidence value indicative of the map matching process. In various embodiments, such a mechanism may be implemented via systems, methods and/or computer program products.

20 Claims, 19 Drawing Sheets

(56) References Cited

U.S. PATENT DOCUMENTS

| | | | | |
|---|---|---|---|---|
| 2014/0032091 A1* | 1/2014 | Arcot | ............... | G08G 1/0129 |
| | | | | 701/119 |
| 2015/0170514 A1* | 6/2015 | Stenneth | ............ | G08G 1/0125 |
| | | | | 701/117 |
| 2015/0354973 A1* | 12/2015 | Wang | ................ | G01S 19/13 |
| | | | | 701/410 |
| 2016/0104377 A1* | 4/2016 | French | ............... | H04H 20/55 |
| | | | | 701/117 |

* cited by examiner

Information amount of shape = w*
(minimal energy cost for a small ball travel along the trajectory
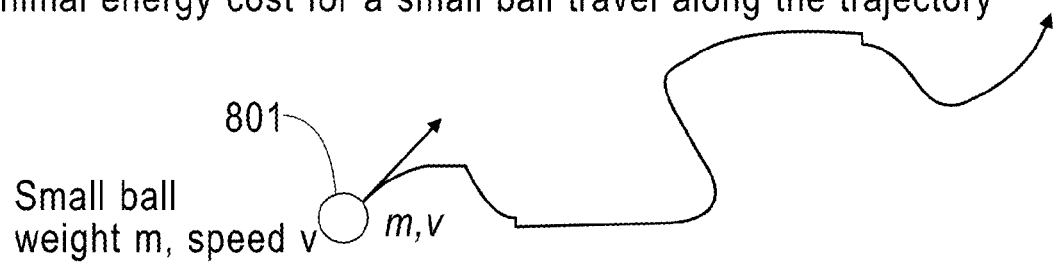
Small ball
weight m, speed v
FIG. 7
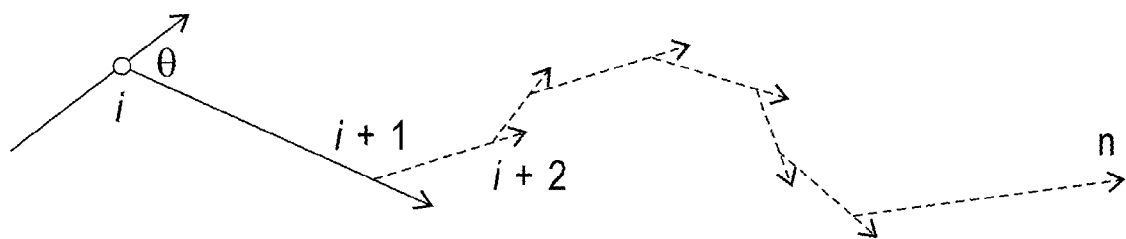
FIG. 8
$$Q_i^- = \frac{1}{2}m(v \sin \theta)^2 \qquad Q_i^+ = \frac{1}{2}mv^2 - \frac{1}{2}m(v \cos \theta)^2$$
$$w^* = \sum_{i=0}^{n}(Q_i^- + Q_i^+)$$
FIG. 9

Fréchet distance

Let S be a metric space. A curve A in S is a continuous map from the unit interval into S, i.e., $A : [0,1] \rightarrow S$. A reparameterization $\alpha$ of $[0,1]$ is a continuous, non-decreasing, surjection $\alpha : [0,1] \rightarrow [0,1]$.

Let A and B be two given curves in S. Then, the Fréchet distance between A and B is defined as the infimum over all reparameterization $\alpha$ and $\beta$ of $[0,1]$ of the maximum over all $t \in [0,1]$ of the distance in S between $A(\alpha(t))$ and $B(\beta(t))$. In mathematical notation, the Fréchet distance $F(A,B)$ is $$F(A,B) = \inf_{\alpha,\beta} \max_{t \in [0,1]} \{ d(A(\alpha(t)), B(\beta(t))) \}$$

where $d$ is the distance function of S.

METHOD, COMPUTER READABLE STORAGE MEDIUM AND SYSTEM FOR PRODUCING AN UNCERTAINTY-BASED TRAFFIC CONGESTION INDEX

BACKGROUND

Traffic congestion information in the form of, for example, a traffic congestion index ("TCI") is widely applied in travel planning and driving guidance (see, e.g., GOOGLE Map, BAIDU Map, etc.).

With the development of telematics and sensor and mobility technologies, millions of connected vehicles will be the reality in the near future. And then, global positioning system ("GPS") data sourced from various vehicles will be typically used for traffic congestion index calculation in a "mega connected vehicle" era.

Referring now to FIG. 1, shown here is an example of a conventional generation of a traffic congestion index depicted on map 101. The traffic congestion index may be show on dedicated portable navigation devices (one of which is shown here as navigation device 103). Further, the traffic congestion index may be show on smart phones (one of which is shown here as smart phone 105). Further still, the traffic congestion index may be show on television broadcasts (one of which is shown here as television broadcast 107).

Still referring to FIG. 1, it is seen that the traffic congestion index may be generated based upon: (a) traffic data from fixed sensors (shown in this FIG. 1 as element 109); (b) traffic data from mobile sensors (shown in this FIG. 1 as element 111); (c) traffic data from public events (shown in this FIG. 1 as element 113); and/or (d) traffic data from GIS-T applications (shown in this FIG. 1 as element 115).

Referring now to FIG. 2A, shown here is an example of a conventional process moving from data preprocessing (201), to data fusion (203), to application (205). As seen, data received from road sensors is preprocessed using: (a) anomaly detection and filtering; and (2) temporal and spatial correlation and compensation. Also, as seen, data received from mobile vehicle sensors is preprocessed using: (a) anomaly detection and filtering; and (2) trajectory pattern analysis; and (3) road mapping. Of note, this conventional workflow includes a lack of measurement with regard to accuracy of data (that is, data uncertainty). Also, in this conventional workflow the data processing and TCI calculation are handled by a different organization.

With respect now in particular to GPS, it is noted that since the readings of a GPS sensor have positioning errors and sampling errors, the departure of the GPS tracking data from the actual trajectory can hardly be avoided. As a result, the task of GPS data preprocessing (including matching original GPS tracking data to a digital map (that is, "map matching") while handling exceptions, correcting errors, reducing noise and redundancy) is a prerequisite to calculating TCI. With respect to this map matching, reference is now made to FIG. 2B, where it is seen that car A is driving on certain roads. In this example, original GPS tracking data of location sequence of A, B, C was received. The task of map matching is to infer the actual location sequence—it can be $A_2, B_1, C_3$ or $A_1, B_2, C_3$ or $A_3, B_1, C_2$ . . . and so on. The output of map matching is the most likely location sequence or trajectory (in this example, $A_1, B_2, C_3$ as shown in the darker polyline marked "1").

However, conventional solutions of TCI calculation typically lack a measurement relating to such uncertainties. That is, conventional solutions of TCI calculation are typically divided into two independent processes: data preprocessing and then TCI calculation. During the conventional TCI calculation phase, all inputs are assumed to be equally certain.

Thus, various embodiments provide a mechanism to measure uncertainties in GPS data processing, and then to improve the quality of traffic congestion index calculation during the second phase. Further, in various embodiments, such a mechanism may be implemented via systems, methods and/or computer program products.

SUMMARY

Various embodiments relate to mechanisms for monitoring motor vehicle traffic conditions and, more particularly, to an improved traffic congestion index for use by drivers in avoiding areas of traffic congestion.

In one embodiment, a computer-implemented method for producing an uncertainty-based traffic congestion index is provided, the method comprising: obtaining, by a processor, a plurality of GPS data points; dividing, by the processor, the plurality of GPS data points into a plurality of variable sliding windows, wherein the dividing maximizes an amount of shape information in each of the plurality of variable sliding windows; performing, by the processor, a map matching process on the plurality of GPS data points as the GPS data points had been divided by the dividing; calculating, by the processor, a confidence value indicative of the map matching process; and producing, by the processor, the traffic congestion index, wherein the traffic congestion index is produced by taking into account the calculated confidence value indicative of the map matching process.

In another embodiment, a computer readable storage medium, tangibly embodying a program of instructions executable by the computer for producing an uncertainty-based traffic congestion index is provided, the program of instructions, when executing, performing the following steps: obtaining a plurality of GPS data points; dividing the plurality of GPS data points into a plurality of variable sliding windows, wherein the dividing maximizes an amount of shape information in each of the plurality of variable sliding windows; performing a map matching process on the plurality of GPS data points as the GPS data points had been divided by the dividing; calculating a confidence value indicative of the map matching process; and producing the traffic congestion index, wherein the traffic congestion index is produced by taking into account the calculated confidence value indicative of the map matching process.

In another embodiment, a computer-implemented system for producing an uncertainty-based traffic congestion index is provided, the system comprising: a processor; and a memory storing computer readable instructions that, when executed by the processor, implement: an obtaining element configured to obtain a plurality of GPS data points; a dividing element configured to divide the plurality of GPS data points into a plurality of variable sliding windows, wherein the dividing maximizes an amount of shape information in each of the plurality of variable sliding windows; a performing element configured to perform a map matching process on the plurality of GPS data points as the GPS data points had been divided by the dividing; a calculating element configured to calculate a confidence value indicative of the map matching process; a producing element configured to produce the traffic congestion index, wherein the traffic congestion index is produced by taking into account the calculated confidence value indicative of the map matching process; and an outputting element configured to output the traffic congestion index.

In one example, the outputting element is configured to output the traffic congestion index in the form of a map.

BRIEF DESCRIPTION OF THE DRAWINGS

Various objects, features and advantages of the present invention will become apparent to one skilled in the art, in view of the following detailed description taken in combination with the attached drawings, in which:

FIG. 5C shows a link missing, and FIG. 5D shows GPS "floating").

FIGS. 7, 8 and 9 depict an example implementation (according to an embodiment) regarding information amount of shape.

FIG. 11 depicts a description of a conventional Fréchet distance determination method.

DETAILED DESCRIPTION

For the purposes of describing and claiming the present invention, the phrase "map matching process" is intended to refer to matching original GPS tracking data to a digital map (e.g., to a road on the digital map).

For the purposes of describing and claiming the present invention, the phrase "confidence value indicative of a map matching process" is intended to refer to an indication of how likely it is that original GPS data is correctly matched to a digital map (e.g., a road on the digital map).

As described herein, a core idea of various embodiments is to add an uncertainty measurement as a new output of a GPS data preprocessing phase, wherein the uncertainty measurement as the new output of the GPS data preprocessing phase is also added as a new input for a traffic congestion index calculation (in this regard, a key problem and challenge is to understand how these uncertainties happen and how to measure them; described herein are a number of explanations of how these uncertainties happen as well as a number of descriptions of how to measure them).

Figure 1:
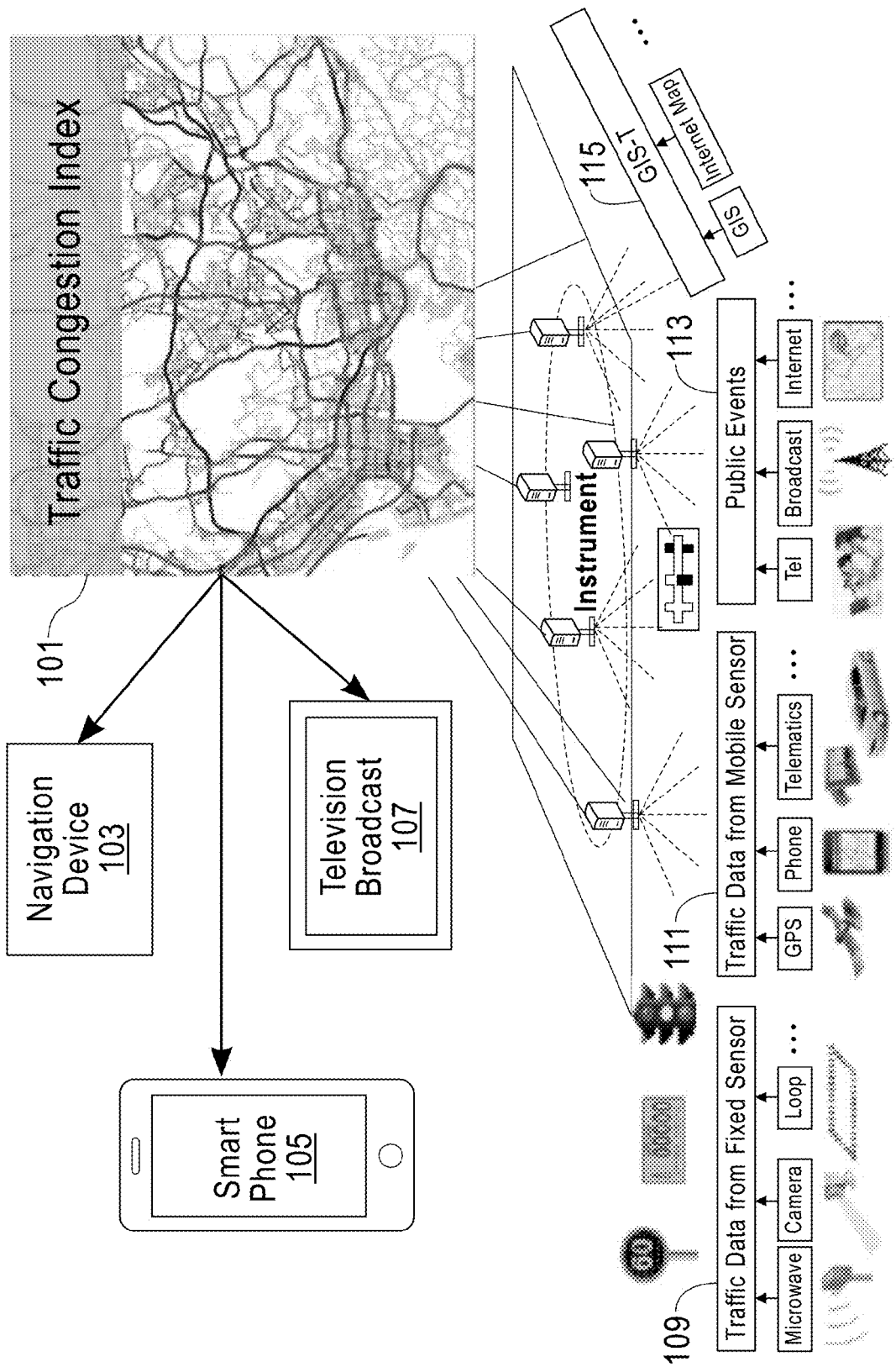
FIG. 1 depicts a diagram showing an example of a conventional generation of a traffic congestion index depicted on a map.
Figure 2A:
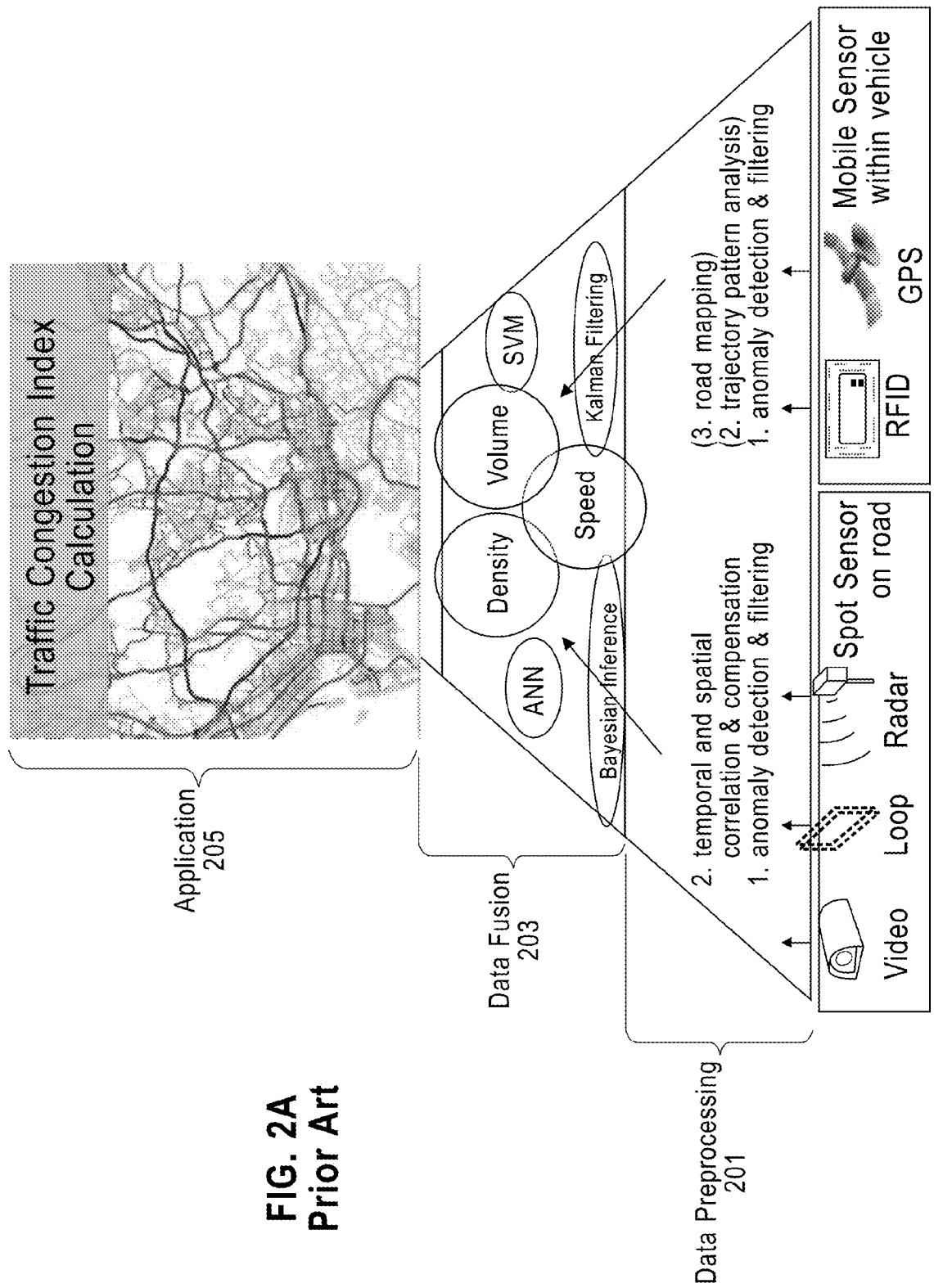
FIG. 2A depicts a diagram showing an example of a conventional process moving from data preprocessing, to data fusion, to application.
Figure 2B:
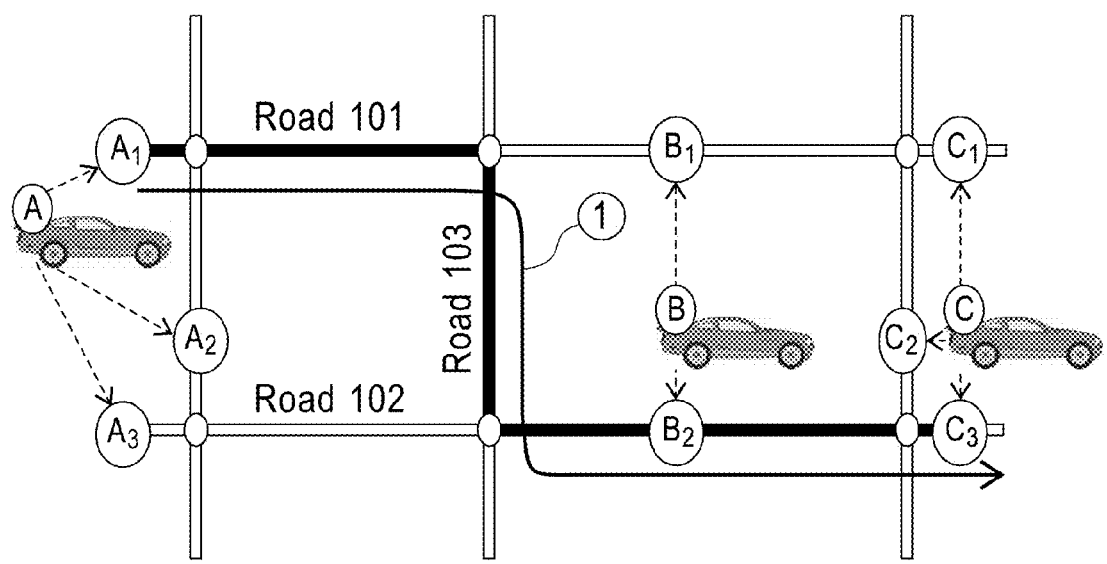
FIG. 2B depicts a diagram showing an example of a conventional map matching process.
Figure 3:
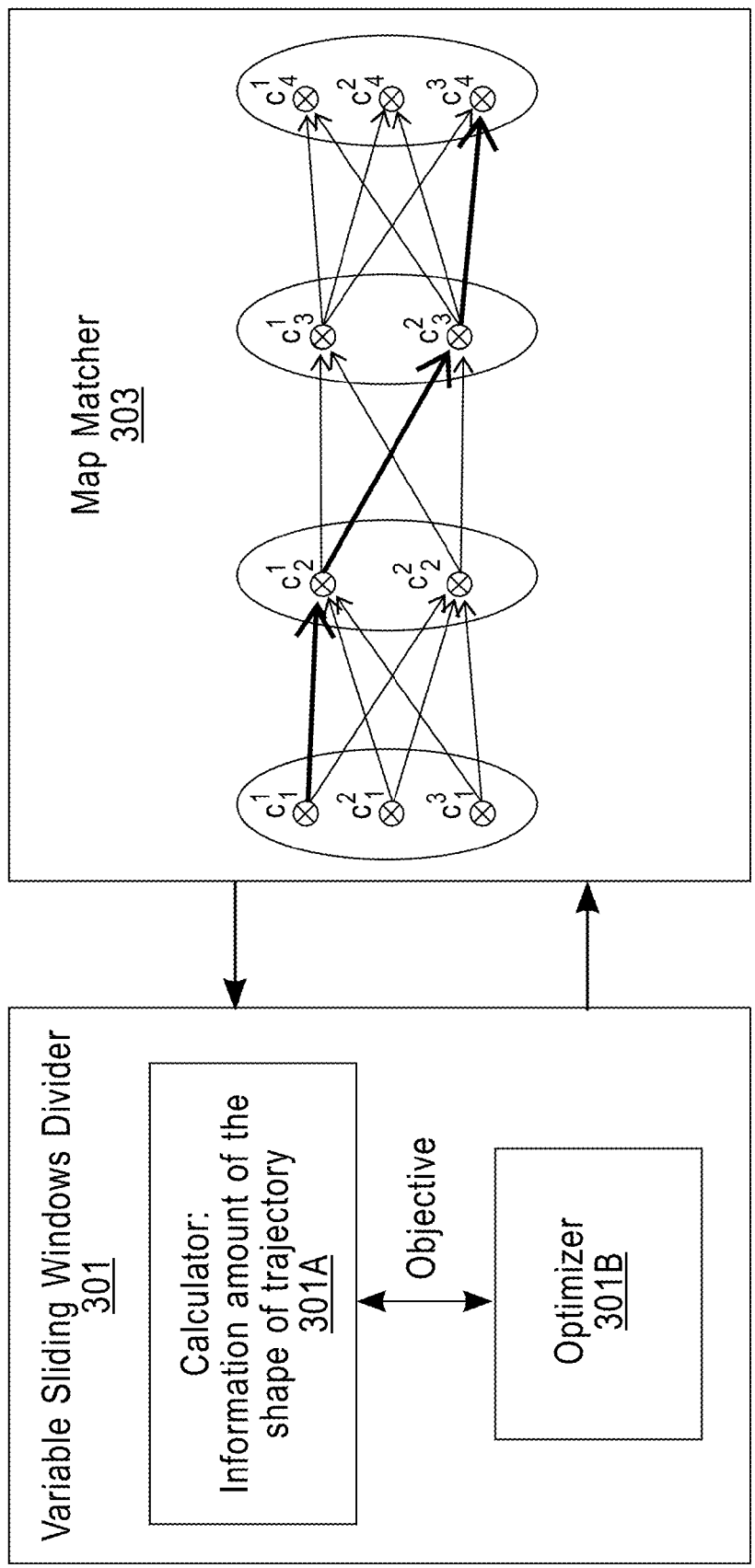
FIG. 3 depicts a block diagram showing a variable sliding windows divider and map matcher according to an embodiment.

Referring now to FIG. 3, a variable sliding windows divider 301 and map matcher 303 according to an embodiment are shown. In this regard, as mentioned above, a key step of GPS data preprocessing is known as map matching (which matches original GPS tracking data to a digital map). As a result, the actual roads each vehicle drove on can be identified. This step is a prerequisite for calculating TCI. However, TCI is based upon aggregated information of all the vehicles that drove through each road segment during a certain time interval (usually 5 minutes to 15 minutes).

In order to get to the TCI calculation phase, a long sequence of raw GPS data must first be divided into sliding windows for map matching. In conventional solutions, the length of the sliding window is usually fixed. In contrast, in various embodiments described herein, the specially designed variable sliding windows divider 301 is used for this purpose. Further, in a "map matching confidence calculator" (which is a part of map matcher 303), a confidence value is calculated for each result of map matching windows. Therefore, the length and the shape of trajectories within each window are critical to the confidence calculation (e.g., a straight line may have no unique features (carry no shape information), and the quality of the confidence value can hardly be guaranteed (possibly there are many alternatives)).

As described herein, this embodiment provides calculator 301A to calculate a shape information amount for the trajectories within each sliding window. Further, the variable sliding windows divider 301 includes an optimization engine (or optimizer) 301B to divide a long sequence of raw GSP data into a number of sliding windows (wherein the shape information amount for all windows is maximized).

Still referring to FIG. 3, the "map matching confidence calculator" (which is a part of map matcher 303) may perform the map matching confidence calculation as follows: (a) evaluate continuity and smoothness of the shape of the trajectories by analysis of GPS data (this is an evaluation of "signal stability"); and/or (b) perform a curve similarity calculation to calculate map matching confidence for each sliding window.

With respect to point (b) above, in one specific example implementation, the Fréchet distance may be used. In mathematics, the Fréchet distance is a measure of similarity between curves that takes into account the location and ordering of the points along the curves. In other examples, other curve similarity methods may be used. In any case, as mentioned above, the variable sliding windows divider 301 can maximize the information amount for all windows (e.g., so the curve similarity calculation quality can be guaranteed and also quantified).

Referring now to why a sliding window is generally necessary, it is noted that a typical trip will usually have more than 1000 GPS sampling points. In this regard, all possible combinations can be very large (e.g. $8*8*10* \ldots *12=1.23*10^{1000}$) Accordingly, it is necessary to divide a long trip into many parts (sliding windows).

Figure 4A:
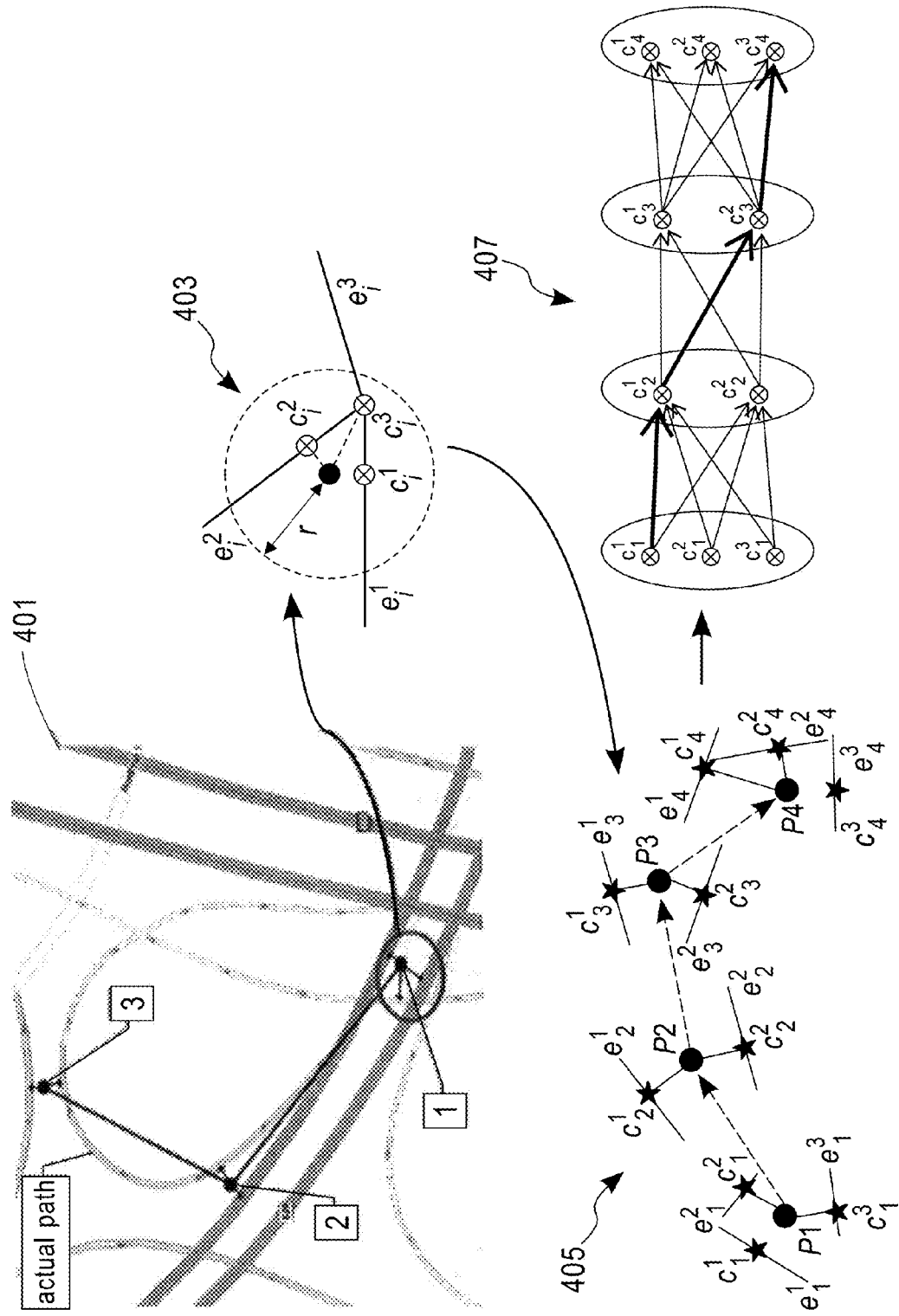
FIG. 4A depicts a block diagram of an example map matching process (of the type carried out by map matcher of FIG. 3) according to an embodiment.

Referring now to FIG. 4A, an example map matching process (of the type carried out by map matcher 303 of FIG. 3) according to an embodiment is shown. As seen, this example map matching process uses points "1", "2" and "3" (shown in map 401), then moves (for each point) to the step shown at 403; to the step shown at 405 and to the step shown at 407.

Figure 4B:
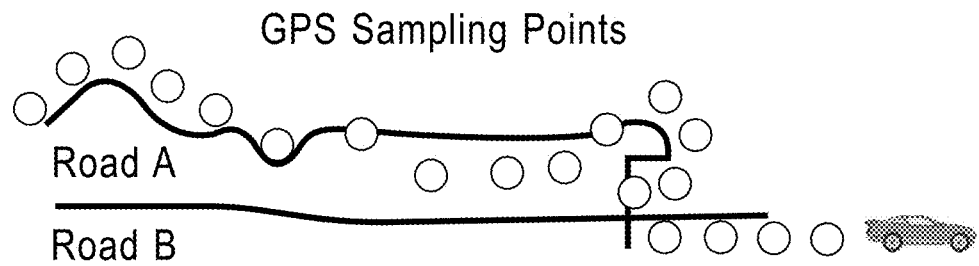
FIGS. 4B, 4C and 4D show diagrams associated with shape information, sliding windows and map matching confidence according to an embodiment.
Figure 4C:
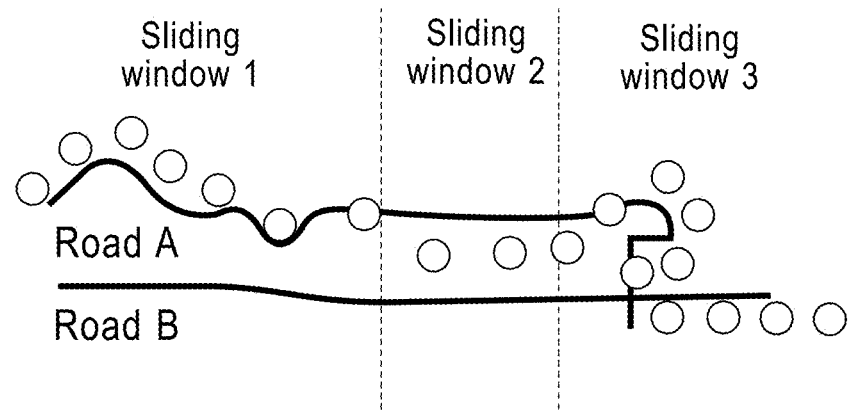
Figure 4D:
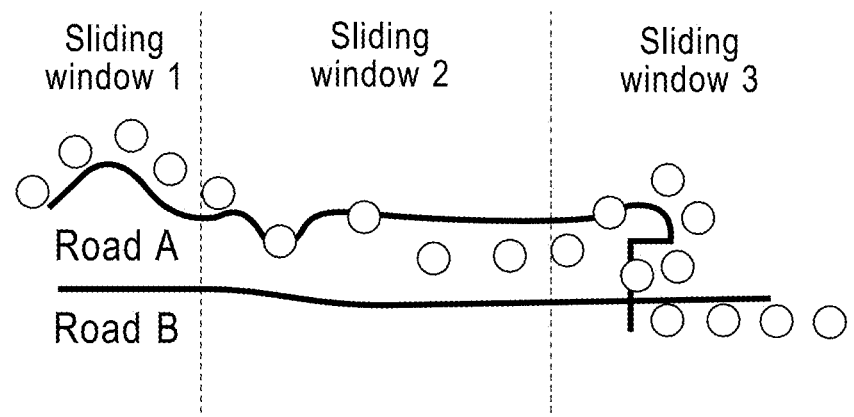

Referring now to FIGS. 4B, 4C and 4D, shown are diagrams associated with shape information, sliding windows and map matching confidence according to an embodiment. More particularly, FIG. 4B shows a number of GPS sampling points and two possible roads (Road A and Road B) that were possibly traveled upon. Referring now to FIG. 4C, it is seen that the trajectory in sliding window 2 has less shape information, so there is no (or low) confidence with respect to the map matching result (that is, was the car actually driven on Road A or Road B?). Referring now to FIG. 4D, however, the trajectory in sliding window 2 has more shape information, so there is more confidence with respect to the map matching result (that is, the car actually drove on Road A).

Figure 5C:
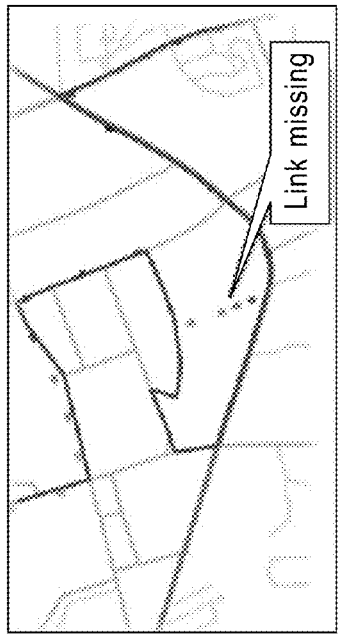
FIGS. 5A-5D depict example maps (according to an embodiment) showing that various uncertainties brought by a GPS device affect the TCI (FIG. 5A shows no signal on bridge), FIG. 5B (shows a tunnel crossing under a lake and a return track after leaving the tunnel to cross an avenue)
Figure 5D:
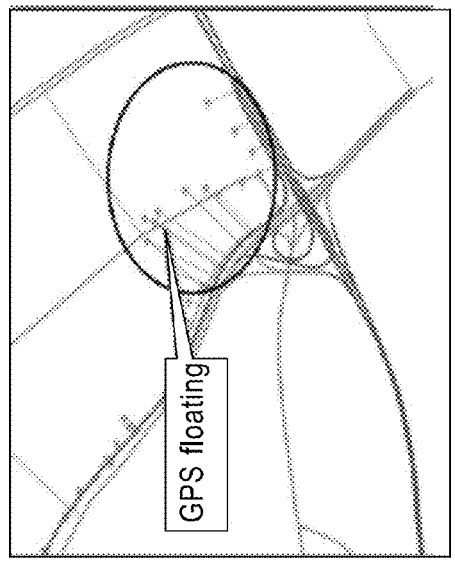
Figure 5A:
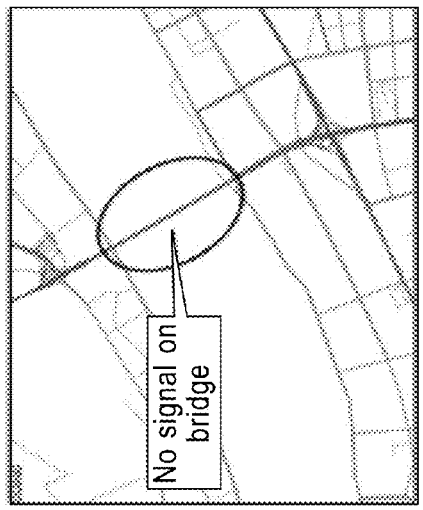
Figure 5B:
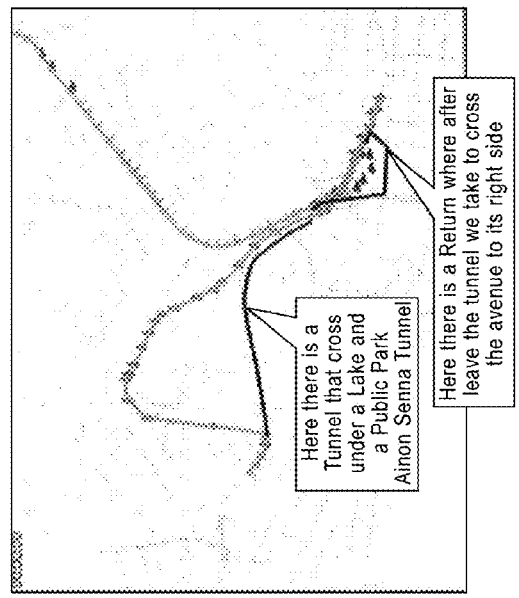
Figure 6A:
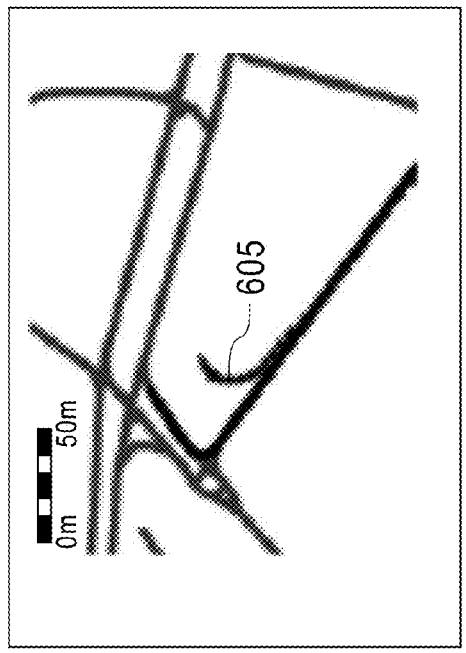
FIGS. 6A-6D depict example maps (according to an embodiment) showing that various trajectories in the variable sliding windows matter (FIG. 6A shows a length and a shape of trajectory 601, FIG. 6B shows a length and a shape of trajectory 603, FIG. 6C shows a length and a shape of trajectory 605, and FIG. 6D shows a length and a shape of trajectory 607).
Figure 6C:
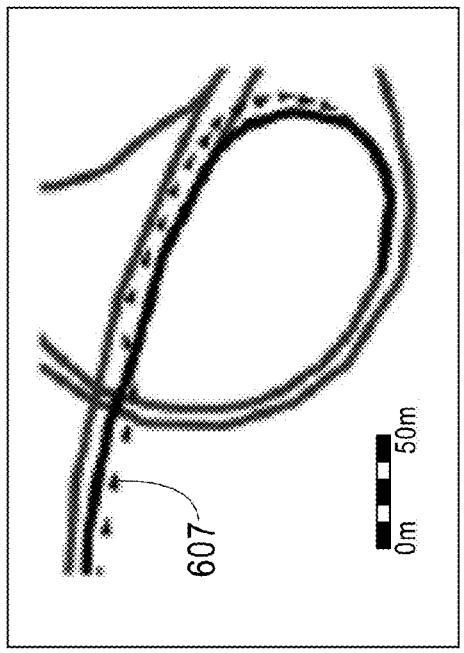
Figure 6B:
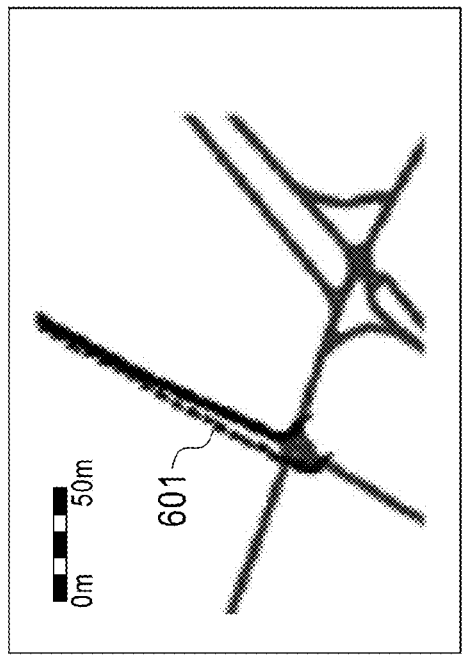
Figure 6D:
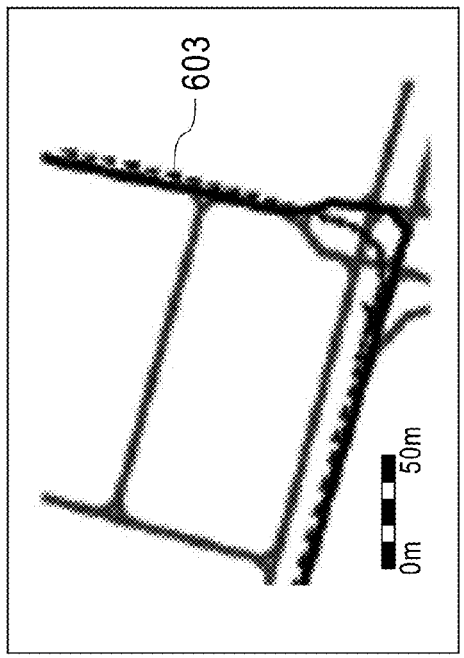

Reference will now be made to a number of observations regarding data collection/processing (these observations have provided basis for some of the processing and/or advantages of various embodiments): (a) probe vehicles are unbalanced both in temporal and spatial dimension; (b) uncertainties brought by GPS devices affect TCI (see, e.g., FIG. 5A (showing no signal on bridge), FIG. 5B (showing a tunnel crossing under a lake and a return track after leaving the tunnel to cross an avenue), FIG. 5C (showing a link missing), FIG. 5D (showing GPS "floating" (that is, being unable to obtain a high accuracy fix)); (c) GPS signals are often unstable and can be affected by many factors (e.g., weather conditions, high buildings, elevated roads, tunnels, bridges); (d) GPS signal errors and interruptions are ubiquitous; (d) uncertainty in map matching can be measured by signal stability, or smoothness (in this regard, it is noted, for example, that a GPS signal may be (as mentioned above) "floating"; and/or that a given path may be missing a GPS signal (e.g., a GPS signal may be lost under an underpass or in tunnel)); (e) uncertainty in map matching can be measured by certain kinds of curve similarity calculation; (f) length and shape of trajectory in variable sliding windows matters (see, e.g., FIGS. 6A-6D, showing various lengths and shapes of various trajectories 601, 603, 605 and 607).

Referring now to FIGS. 7, 8 and 9, an example implementation regarding information amount of shape according to an embodiment is shown (that is, these FIGS. relate to how to calculate shape information for a given curve). As seen (see FIG. 7), suppose a hypothetical small ball 801 with weight m is running along a given trajectory with a constant speed v. Then the minimal energy amount needed to be consumed to move weight m at speed v can serve as the shape information amount (that is, as a higher amount of energy is needed, the shape information amount increases). See also, FIG. 8—showing a mathematical representation of the curve shown in FIG. 7; see also, FIG. 9—showing certain equations associated with the mathematical representation of FIG. 8 Further, as mentioned above, the variable sliding windows divider 101 of FIG. 3 includes an optimization engine (or optimizer) 301B to divide a long sequence of raw GSP data into a number of sliding windows (wherein the shape information amount for all windows is maximized). In this regard (that is, with respect to "How to maximize shape information amount?" with the variable sliding windows divider) it is noted that certain kinds of optimizer may be used to find the best cutting plan of sliding windows, for example, to let the information amount of shape for all sliding windows be maximized use constraints regarding minimal length of each window, delay requirement of online calculation (should not be too long), congestion reporting interval (usually 5-10 mins) etc. Further (and referring again to FIG. 3) there can be a feedback mechanism between the variable sliding window divider (VSWD) and the map matcher (MM) wherein: the VSWD outputs a cutting plan of sliding windows into MM, then the MM can request the VSWD to adjust the cutting plan if the MM finds highly competitive alternative trajectories within some sliding windows.

Figure 10:
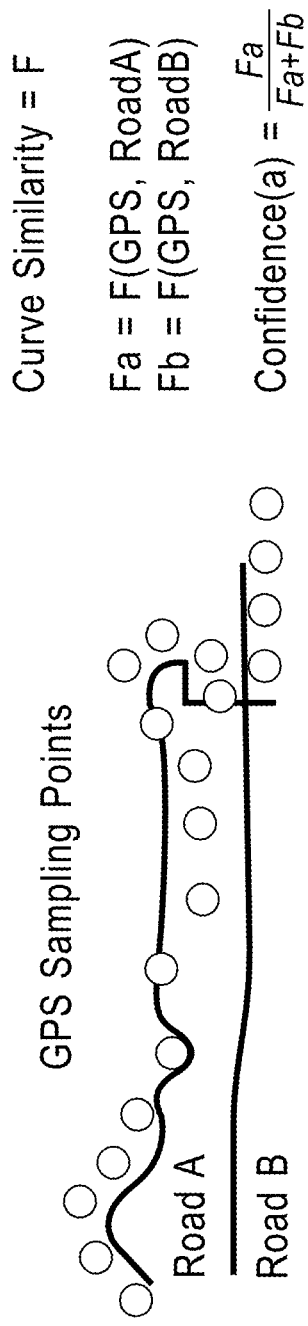
FIG. 10 depicts a description of a conventional curve similarity determination method.

Referring now to FIG. 10, a description of a conventional curve similarity determination method is provided. In one specific example, this conventional curve similarity determination method may be utilized in the map matching process described herein.

Referring now to FIG. 11, a description of a conventional Fréchet distance determination method is provided. In one specific example, this conventional Fréchet distance determination method may be utilized in the map matching process described herein.

Figure 12A:
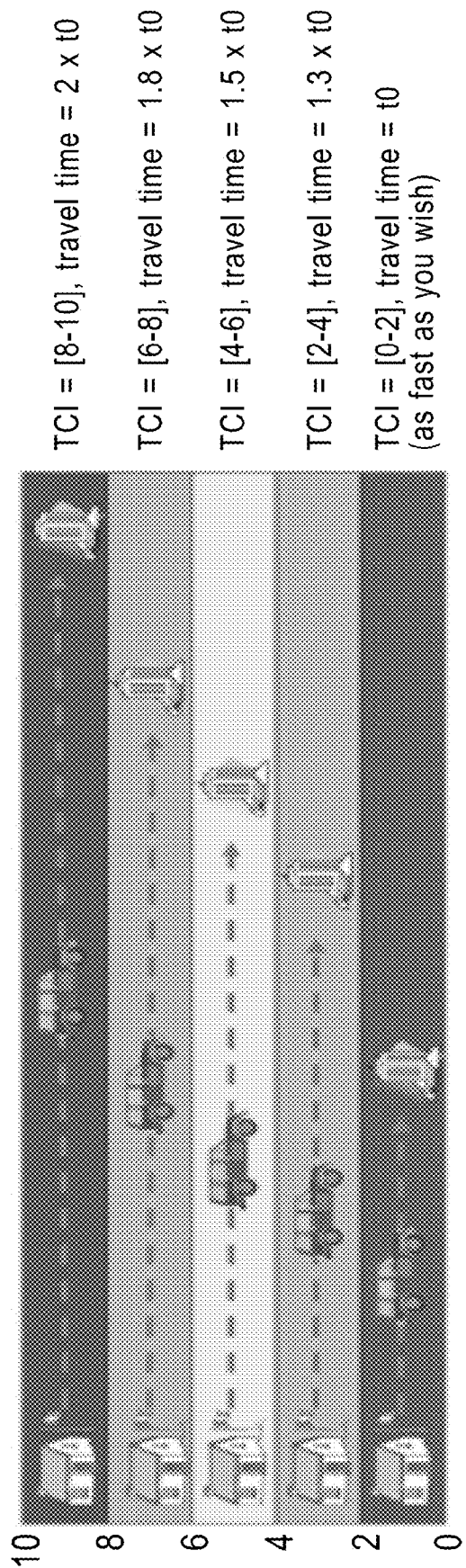
FIG. 12A depicts a drawing related to an example traffic congestion index calculation and FIG. 12B depicts a map showing an example traffic congestion index output.
Figure 12B:
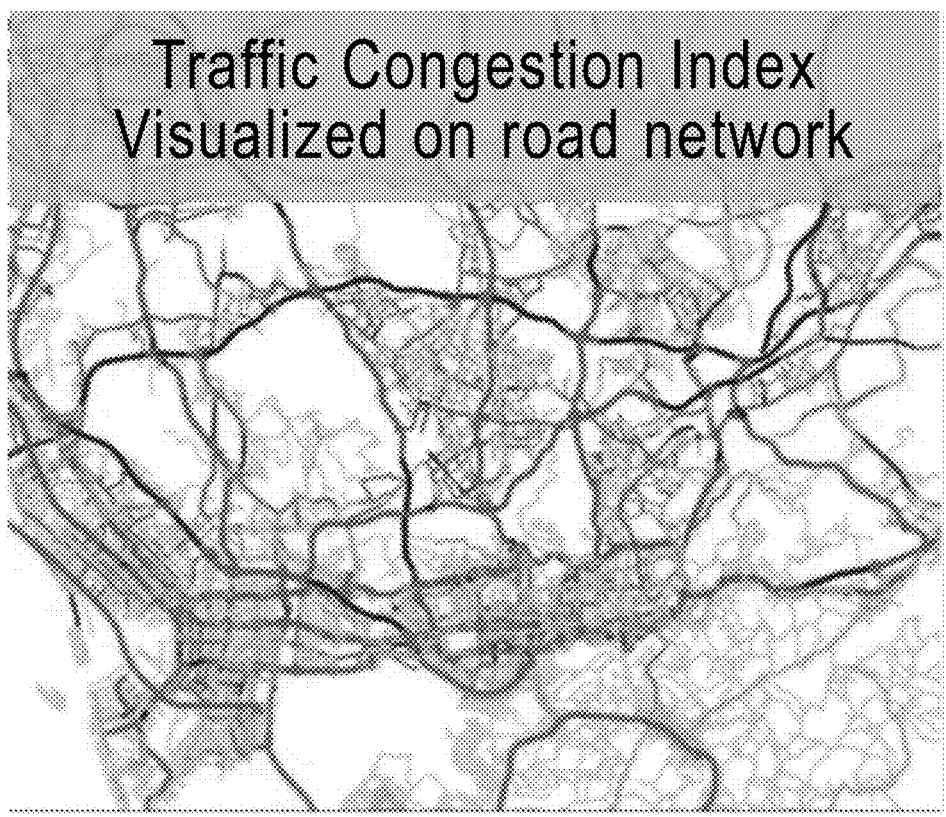

Referring now to FIGS. 12A and 12B, FIG. 12A depicts a drawing related to an example traffic congestion index calculation and FIG. 12B depicts a map showing an example traffic congestion index output. More particularly, as seen in FIG. 12A, in this example, traffic congestion index can be defined as a value of [0-10] for each road segment (when, for example, TCI=1, you can drive as fast as you wish; when, for example, TCI=8, you will be slowed down 2× (relative to TCI=0)). Further, as seen in FIG. 12B, map 1200 may have roads color-coded to the associated TCI for each road.

Figure 13:
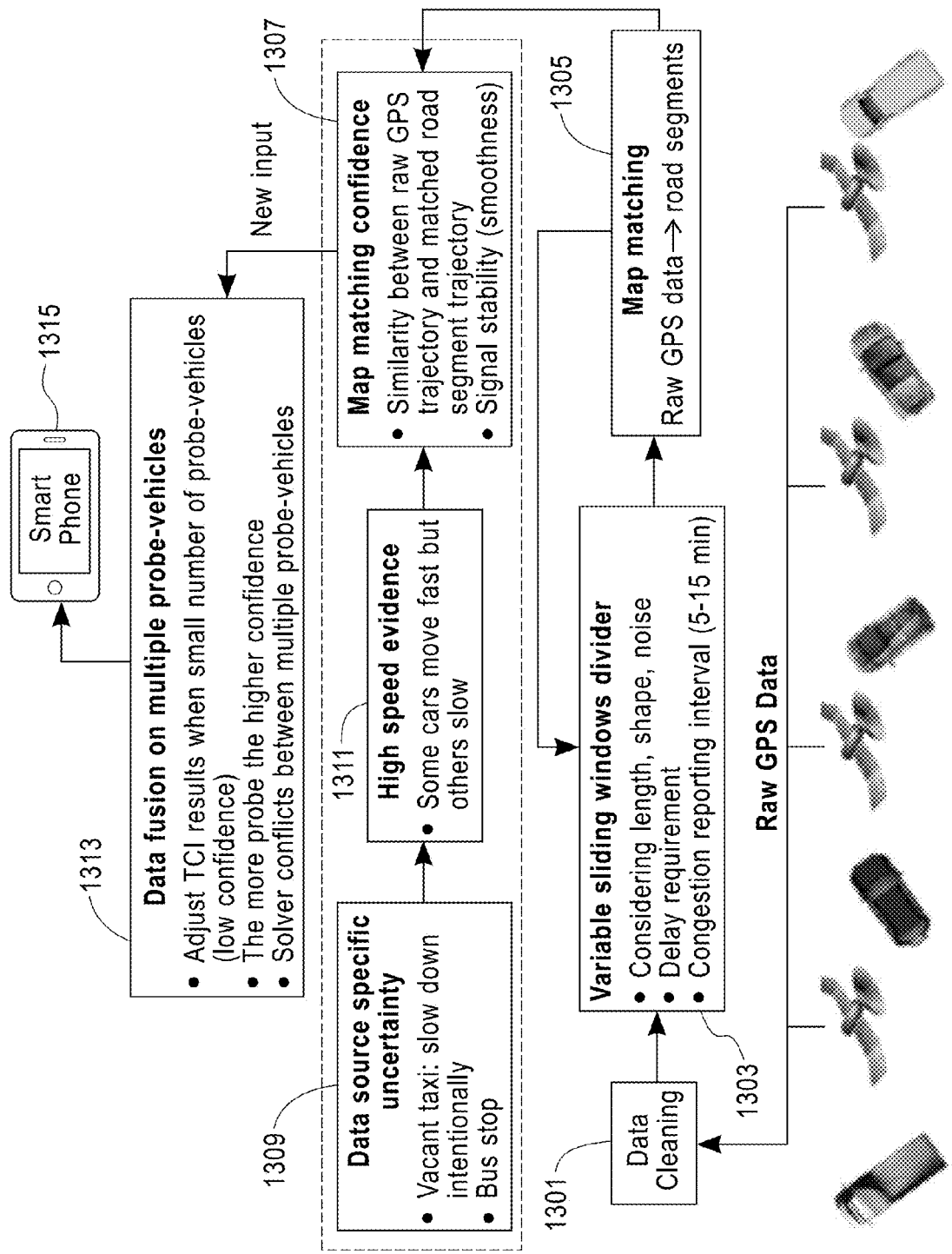
FIG. 13 depicts a flowchart of a method according to an embodiment.

Referring now to FIG. 13, an example process for calculating a traffic congestion index according to an embodiment is shown. As seen, the raw GPS data is "cleaned" at data cleaning step 1301. Then at step 1303, the cleaned data is provided to a variable sliding windows divider to produce a number of variable sliding windows (this step may be performed considering length, shape and noise; further, this step may be performed with respect to a delay requirement; further still, this step may be performed with respect to a congestion reporting interval (e.g., 5-15 minutes)). Then at step 1305, an output from step 1303 is received for map matching (this step 1305 may be performed to match the raw GPS data to various road segments). In step 1305, each road segment may relate to a number of matched trajectories. Further, data may be fed back from step 1305 to step 1303. In addition, data from step 1305 is provided to step 1307, which is a process for determining map matching confidence. Also received at step 1307 may be: (a) information from step 1309, related to data source specific uncertainty (e.g., a vacant taxi may slow down intentionally (such as to pick up a rider); a bus stops at numerous locations (such as to pick up and/or drop off passengers)); and/or (b) information from step 1311, related to high speed evidence (e.g., some cars may move fast but others may move slow). In any case, the map matching confidence determination process at step 1307 may compute: (a) similarity between raw GPS trajectory and matched road segment trajectory; and/or (b) signal stability (smoothness). Further, the output of the map matching confidence determination step 1307 may be provided (as a "new input") to step 1313, relating to data fusion from multiple probe vehicles. This step 1313 may adjust the TCI results when there are a small number of probe vehicles (low confidence). In this regard, the more probe vehicles that are involved, the higher the confidence. In addition, a solver may be used to solve conflicts between multiple probe vehicles. Finally, a TCI may be provided from step 1313 to smart phone 1315 (of course, the TCI may also (or instead) be provided to any other desired device(s)).

Still referring to FIG. 13, with respect to step 1301, obvious errors in GPS sampling sequence will be eliminated (e.g. 1000 km far from most of other GPS points, timestamp error such as data from year of 1949 or 2046, etc.). With respect to step 1309, it is noted that the principle of traffic congestion is to use sample data (GPS, time, speed, heading, etc.) from many different kinds of vehicles, such as taxi, bus, truck, private car, etc. In this regard, there are data source specific uncertainties (e.g. vacant taxis usually slow down to attract passengers). Accordingly, sampling data from these taxis do not represent congestion. Similarly, buses also stop for boarding and alighting passengers other than when the road is congested. With respect to step 1311 (about high speed evidence), it is noted, for example, that sampling data from two vehicles may be received indicating that they just traveled the same road segment. However, the data indicates that one vehicle ran very fast, but another ran very slow. Under such circumstance, how should the amount of traffic congestion of this road segment be decided? That is, congested or free-flow? Such kind of uncertainty can be called high speed evidence, which means received an evidence that a vehicle can run fast on this road. It can be assumed that the fast evidence is correct but that the slow result is caused by some other personal reasons (e.g. answering phone).

As described herein, the traffic congestion index may take into account the confidence value. More particularly, in one example, the traffic congestion index represents average traffic congestion level of the last 5-15 minutes for each road segment. That means all vehicles that traveled on the road segment during the last 5-15 minutes can have contributions to the TCI. A sample implementation for TCI is the average travel time/speed of all vehicles. Without a map matching confidence value, it can generally only be assumed that each vehicle is equally important. However, according to various embodiments, provided is a measure of confidence that some of the vehicles had actually not traveled on a particular road (for example, with respect to data from 20 low-confidence vehicles, these data (low confidence) can just be ignored or get weighted result other than just get average result).

As described herein, TCI can be adjusted based on confidence (measure of uncertainty). As mentioned above, the principle of traffic congestion index is to use sample data (GPS, time, speed, heading, etc.) from many different kinds of vehicles (probe), such as taxi, bus, truck, private car, etc. Probe vehicles are unbalanced both in temporal and spatial dimension (e.g., no probe vehicle traveling on suburban roads during all day; small number of probe vehicles travel on urban road during certain time span). In this regard, the following scenarios may be considered: (a) if only sampling data from one vehicle on a road is received, report the traffic as unknown on the road if the map matching confidence is low; if sampling data from many vehicles is received, trust the high confidence data (as well as consider high speed evidence (discussed above)).

Figure 14:
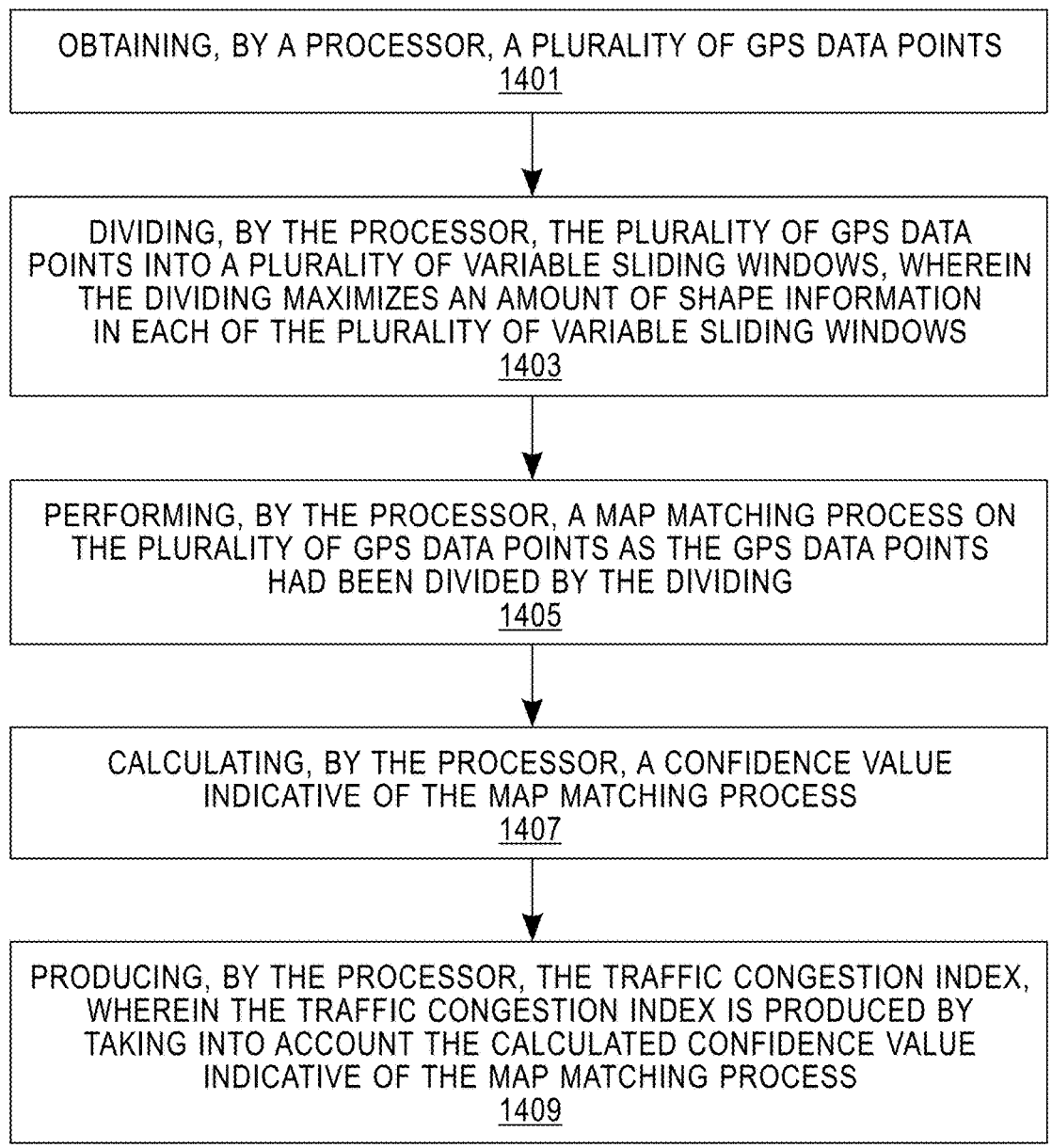
FIG. 14 depicts a flowchart of a method according to an embodiment.

Referring now to FIG. 14, a method for producing an uncertainty-based traffic congestion index is shown. As seen in this FIG. 14, the method of this embodiment comprises: at 1401—obtaining, by a processor, a plurality of GPS data points; at 1403—dividing, by the processor, the plurality of GPS data points into a plurality of variable sliding windows, wherein the dividing maximizes an amount of shape information in each of the plurality of variable sliding windows; at 1405—performing, by the processor, a map matching process on the plurality of GPS data points as the GPS data points had been divided by the dividing; at 1407—calculating, by the processor, a confidence value indicative of the map matching process; and at 1409—producing, by the processor, the traffic congestion index, wherein the traffic congestion index is produced by taking into account the calculated confidence value indicative of the map matching process.

Figure 15:
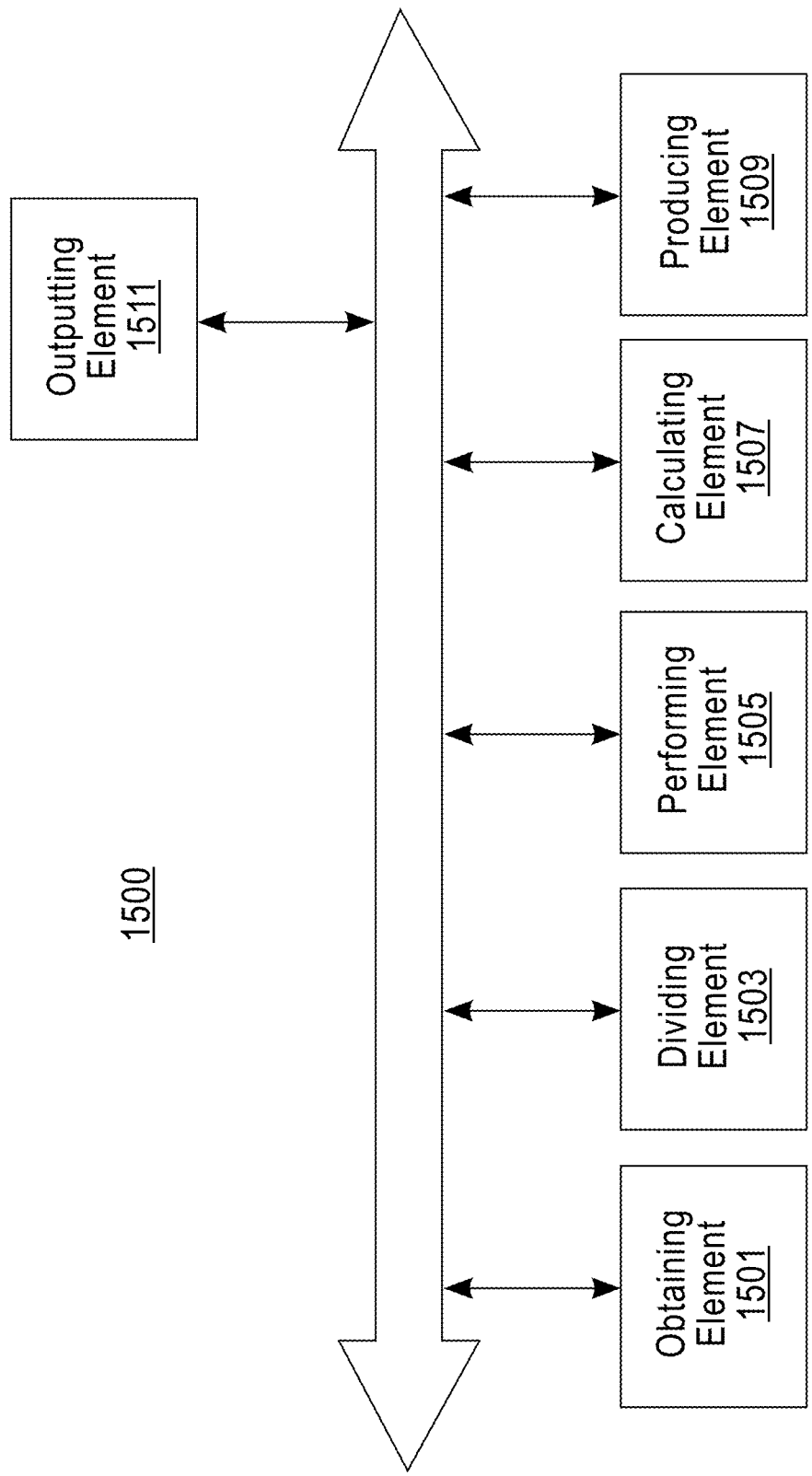
FIG. 15 depicts a block diagram of a system according to an embodiment.

Referring now to FIG. 15, a system 1500 for producing an uncertainty-based traffic congestion index is provided. This system may include a processor (not shown); and a memory (not shown) storing computer readable instructions that, when executed by the processor, implement: an obtaining element 1501 configured to obtain a plurality of GPS data points; a dividing element 1503 configured to divide the plurality of GPS data points into a plurality of variable sliding windows, wherein the dividing maximizes an amount of shape information in each of the plurality of variable sliding windows; a performing element 1505 configured to perform a map matching process on the plurality of GPS data points as the GPS data points had been divided by the dividing; a calculating element 1507 configured to calculate a confidence value indicative of the map matching process; a producing element 1509 configured to produce the traffic congestion index, wherein the traffic congestion index is produced by taking into account the calculated confidence value indicative of the map matching process; and an outputting element 1511 configured to output the traffic congestion index.

In one example, communication between and among the various components of FIG. 15 may be bi-directional. In another example, the communication may be carried out via the Internet, an intranet, a local area network, a wide area network and/or any other desired communication channel(s). In another example, each of the components may be operatively connected to each of the other components. In another example, some or all of these components may be implemented in a computer system of the type shown in FIG. 16.

Figure 16:
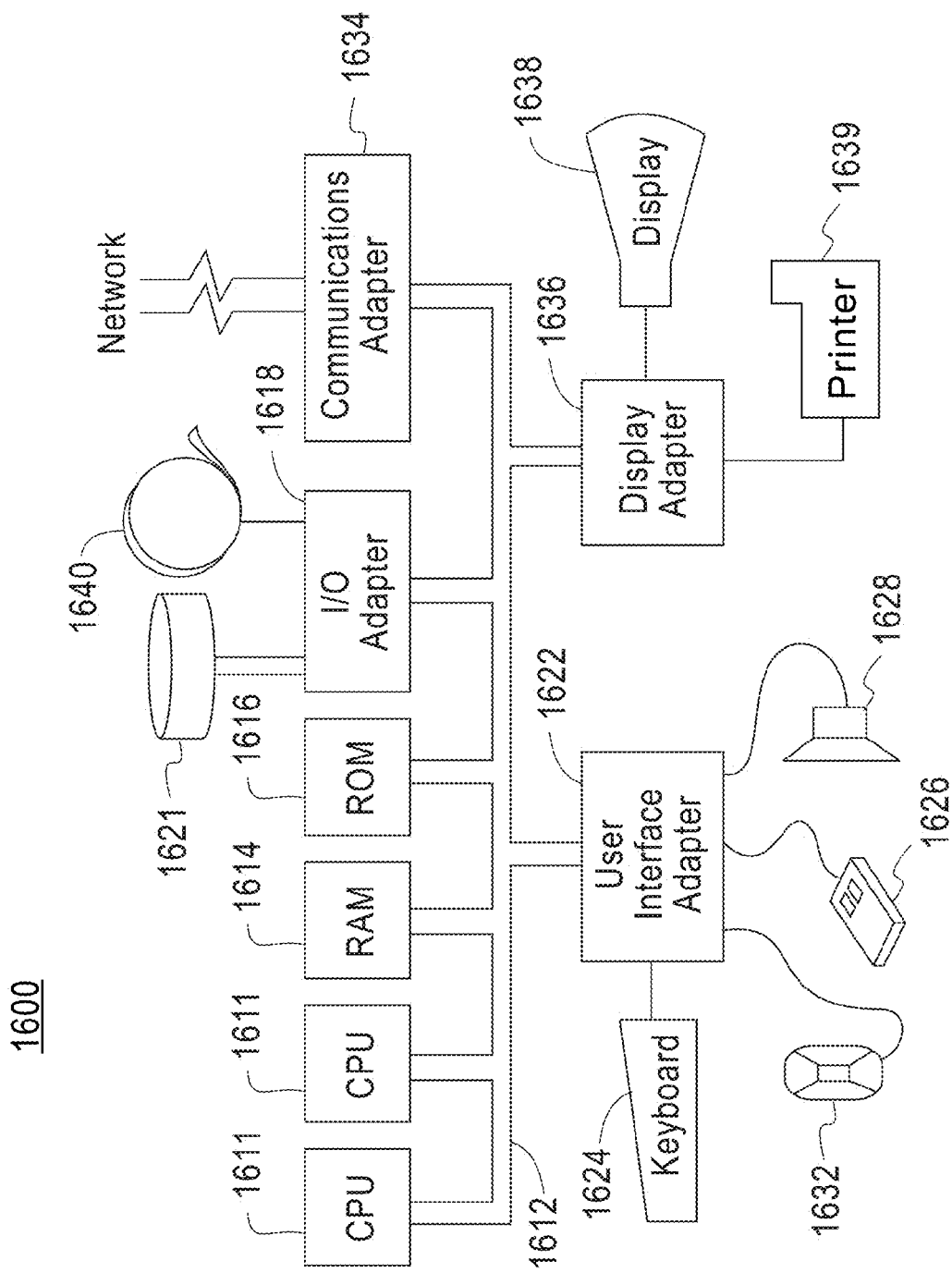
FIG. 16 depicts a block diagram of a system according to an embodiment.

Referring now to FIG. 16, this figure shows a hardware configuration of computing system 1600 according to an embodiment of the present invention. As seen, this hardware configuration has at least one processor or central processing unit (CPU) 1611. The CPUs 1611 are interconnected via a system bus 1612 to a random access memory (RAM) 1614, read-only memory (ROM) 1616, input/output (I/O) adapter 1618 (for connecting peripheral devices such as disk units 1621 and tape drives 1640 to the bus 1612), user interface adapter 1622 (for connecting a keyboard 1624, mouse 1626, speaker 1628, microphone 1632, and/or other user interface device to the bus 1612), a communications adapter 1634 for connecting the system 1600 to a data processing network, the Internet, an Intranet, a local area network (LAN), etc., and a display adapter 1636 for connecting the bus 1612 to a display device 1638 and/or printer 1639 (e.g., a digital printer or the like).

As described herein, mechanisms are provided for utilizing uncertainty measurement(s) as input to calculate a traffic congestion index. In one example, the uncertainty measurement(s) are included in outputs of a GPS preprocessing step.

In one specific example, the uncertainty measurement(s) are based upon calculating shape information amount for trajectories within each of a plurality of sliding windows (wherein a long sequence of raw GPS data has been divided into the plurality of sliding windows for map matching). In another specific example, the uncertainty measurement(s) are based upon evaluating continuity and smoothness of a shape of each trajectory by utilizing raw GPS data to determine signal stability.

As described herein, mechanisms are provided for digging-out the uncertainty carried by raw data (based on, for example, map matching confidence and data-fusion), in order to evaluate if the signal source is sufficiently accurate to provide the traffic congestion index.

As described herein, mechanisms are provided to improve the accuracy of traffic congestion index evaluation by considering the confidence level of traffic data collected from probe vehicles (e.g., in the form of GPS data). The confidence level may be determined by a confidence evaluation of map-matching results based on GPS data (using the unique insight that the traffic congestion index estimation is considerably affected by the map-matching accuracy). In this example, the uncertainty comes from readings of a GPS sensor (GPS have positioning errors and sampling errors, wherein the departure of the GPS tracking data from the actual trajectory can hardly be avoided).

As described herein, mechanisms are provided for data processing and TCI calculation to be handled by the same organization.

As described herein, mechanisms are provided for adding a new output (uncertainty measurement) to the map matching process. Accordingly, during the TCI calculation phase, the TCI can be adjusted in a low confidence situation. In addition, conflicts can be solved when multiple data is received from different probe vehicles.

In another embodiment, data from, for example, vacant taxis are useful in the TCI calculation by managing uncertainties (in conventional solutions, data from vacant taxis are typically eliminated entirely).

In another example, a map may be displayed in which colors are gradually changed in the traffic congestion index results due to the traffic congestion being gradually propagated over the road network.

As described herein, various mechanisms are provided to match a segment of GPS sequence (within a sliding window) to a trajectory on road network (where there might be many alternative trajectories). Further, a low measure of confidence may be assigned to the map matching results if a given GPS sequence has a little amount of shape information.

Figure 17A:
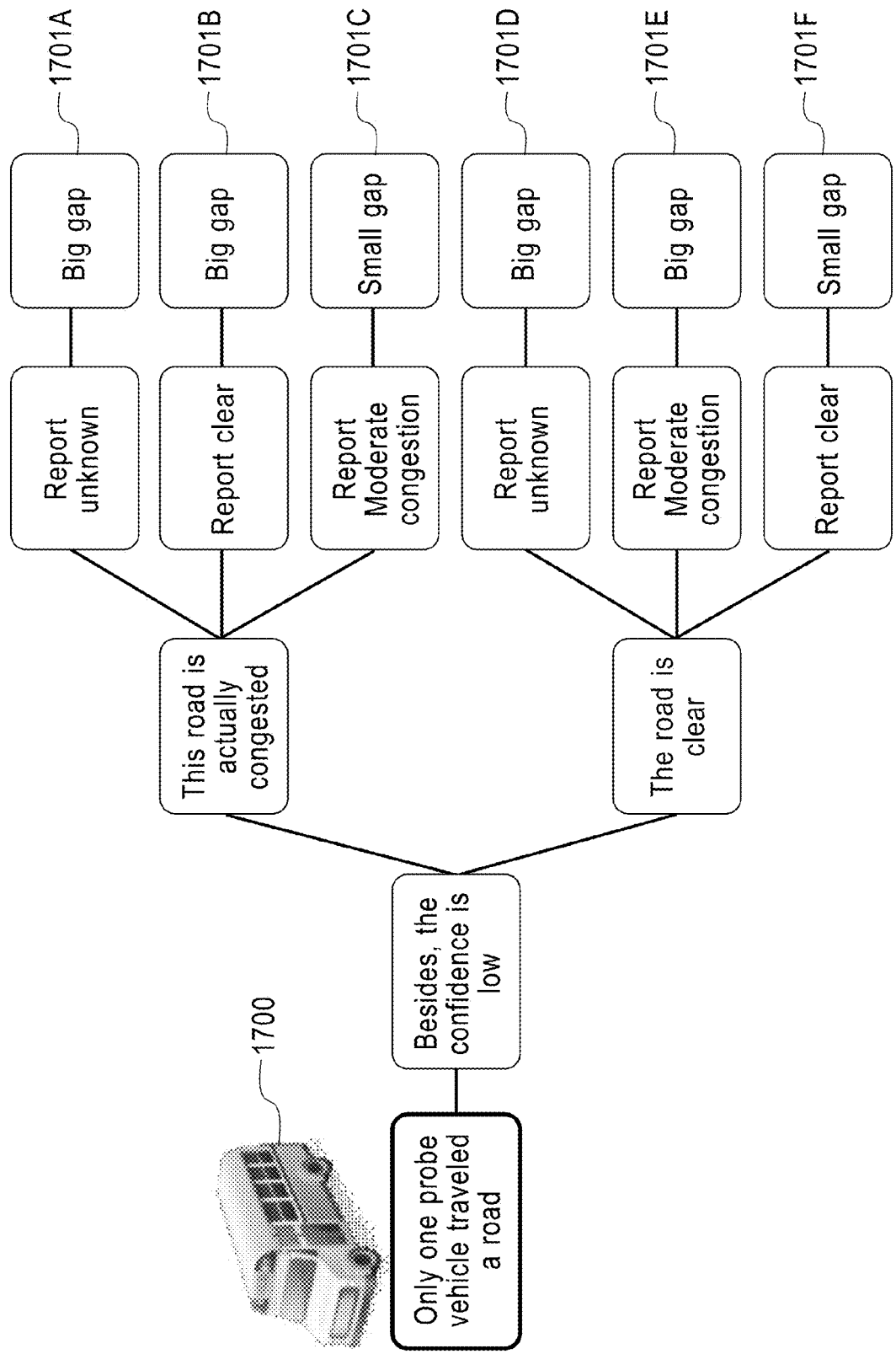
FIGS. 17A and 17B depict diagrams relating to an embodiment in which a psychological gap may be minimized by managing uncertainties.
Figure 17B:
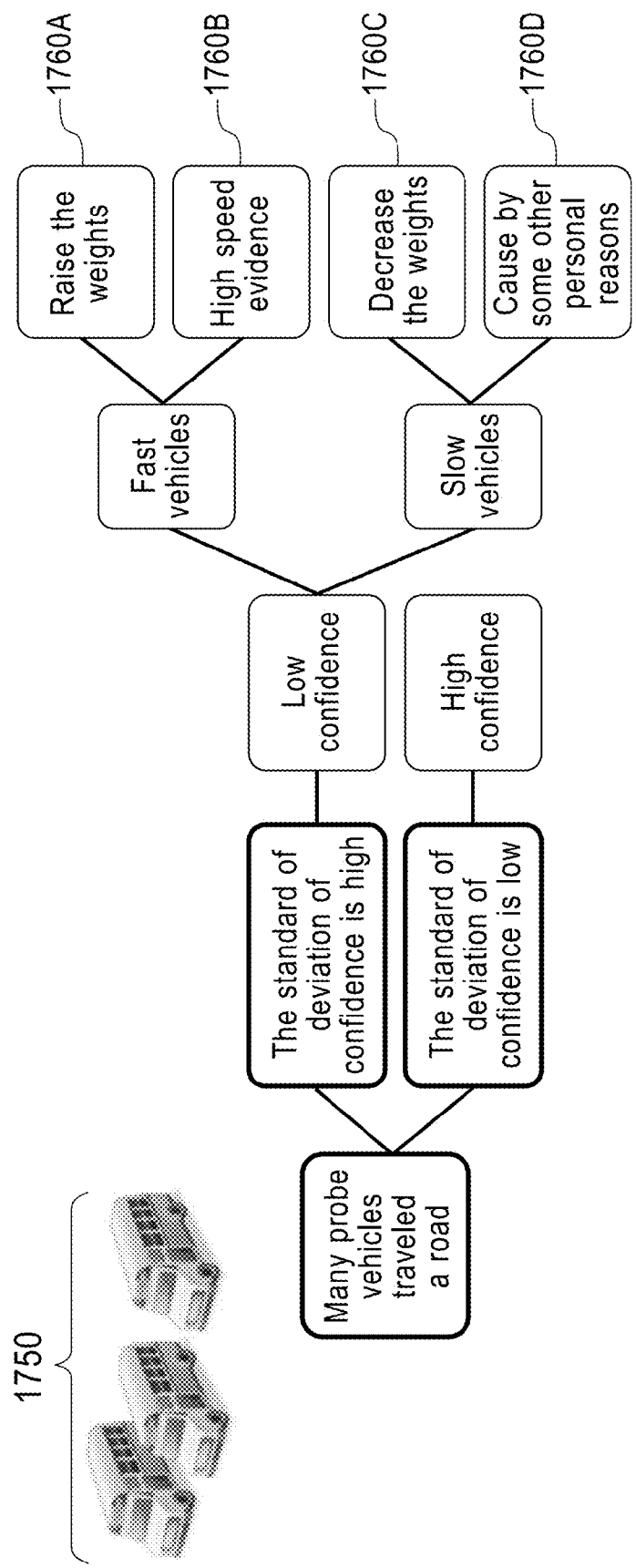

Referring now to FIGS. 17A and 17B, diagrams relating to an embodiment in which a psychological gap may be minimized by managing uncertainties are shown. More particularly, as mentioned above the TCI can be adjusted based on confidence (measure of uncertainty). If, for example, various aspects of the present disclosure were applied to an "app" (like GOOGLE map), a definition of the psychological gap of users with regards to user experience may be made. Such a definition represents the gap between user's expectation and the traffic information the app offers (satisfied or disappointed). For example, with respect to FIG. 17A (where there is data from only one probe vehicle 1700), various levels of psychological gaps (1701A-1701F) may be produced depending upon the traffic congestion index that is reported. Further, with respect to FIG. 17B (where there are many probe vehicles 1750) various factors 1760A-1760D may be taken into account to more closely match the reported traffic congestion index to the actual level of traffic on the road.

In one embodiment, a computer-implemented method for producing an uncertainty-based traffic congestion index is provided, the method comprising: obtaining, by a processor, a plurality of GPS data points; dividing, by the processor, the plurality of GPS data points into a plurality of variable sliding windows, wherein the dividing maximizes an amount of shape information in each of the plurality of variable sliding windows; performing, by the processor, a map matching process on the plurality of GPS data points as the GPS data points had been divided by the dividing; calculating, by the processor, a confidence value indicative of the map matching process; and producing, by the processor, the traffic congestion index, wherein the traffic congestion index is produced by taking into account the calculated confidence value indicative of the map matching process.

In one example, the method further comprises outputting, by the processor, the traffic congestion index.

In another example, the dividing produces at least a first variable sliding window having a first time span and a second variable sliding window having a second time span, wherein the first time span is different from the second time span.

In another example, the map matching process is performed for each of the plurality of variable sliding windows.

In another example, the calculating the confidence value comprises evaluating for each of the variable sliding windows, for each shape contained therein, an amount of continuity of a trajectory associated with the plurality of GPS data points.

In another example, the calculating the confidence value comprises evaluating for each of the variable sliding windows, for each shape contained therein, an amount of smoothness of a trajectory associated with the plurality of GPS data points.

In another example, the calculating the confidence value comprises evaluating for each of the variable sliding windows, for each shape contained therein, a curve similarity associated with the plurality of GPS data points.

In another example, the curve similarity is calculated relative to a road on a digital map.

In another example, the curve similarity is calculated by determining a Fréchet distance.

In another example, the plurality of GPS data points are obtained from a plurality of probe vehicles.

In another embodiment, a computer readable storage medium, tangibly embodying a program of instructions executable by the computer for producing an uncertainty-based traffic congestion index is provided, the program of instructions, when executing, performing the following steps: obtaining a plurality of GPS data points; dividing the plurality of GPS data points into a plurality of variable sliding windows, wherein the dividing maximizes an amount of shape information in each of the plurality of variable sliding windows; performing a map matching process on the plurality of GPS data points as the GPS data points had been divided by the dividing; calculating a confidence value indicative of the map matching process; and producing the traffic congestion index, wherein the traffic congestion index is produced by taking into account the calculated confidence value indicative of the map matching process.

In one example, the program of instructions, when executing, performs outputting the traffic congestion index.

In another example, the dividing produces at least a first variable sliding window having a first time span and a second variable sliding window having a second time span, wherein the first time span is different from the second time span.

In another example, the map matching process is performed for each of the plurality of variable sliding windows.

In another example: the calculating the confidence value comprises evaluating for each of the variable sliding widows, for each shape contained therein, a curve similarity associated with the plurality of GPS data points; the curve similarity is calculated relative to a road on a digital map; and the curve similarity is calculated by determining a Fréchet distance.

In another embodiment, a computer-implemented system for producing an uncertainty-based traffic congestion index is provided, the system comprising: a processor; and a memory storing computer readable instructions that, when executed by the processor, implement: an obtaining element configured to obtain a plurality of GPS data points; a dividing element configured to divide the plurality of GPS data points into a plurality of variable sliding windows, wherein the dividing maximizes an amount of shape information in each of the plurality of variable sliding windows; a performing element configured to perform a map matching process on the plurality of GPS data points as the GPS data points had been divided by the dividing; a calculating element configured to calculate a confidence value indicative of the map matching process; a producing element configured to produce the traffic congestion index, wherein the traffic congestion index is produced by taking into account the calculated confidence value indicative of the map matching process; and an outputting element configured to output the traffic congestion index.

In one example, the outputting element is configured to output the traffic congestion index in the form of a map.

In another example, the dividing produces at least a first variable sliding window having a first time span and a second variable sliding window having a second time span, wherein the first time span is different from the second time span.

In another example, the map matching process is performed for each of the plurality of variable sliding windows.

In another example, the outputting element is configured to output the traffic congestion index to at least one of: (a) a display; (b) a hardcopy printer; (c) a data storage device; and (d) any combination thereof.

In other examples, any steps described herein may be carried out in any appropriate desired order.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for producing an uncertainty-based traffic congestion index, the method comprising:
   obtaining, by a processor, raw GPS data from a GPS receiver associated with a vehicle, the raw data comprising a plurality of GPS data points for tracking the vehicle;
   measuring, by the processor, an uncertainty in processing the raw GPS data by dividing the plurality of GPS data points into a plurality of variable sliding windows, wherein the dividing maximizes an amount of shape information in each of the plurality of variable sliding windows;
   performing, by the processor, a map matching process on the plurality of GPS data points as the GPS data points had been divided by the dividing to match the plurality of GPS data points to a digital map, and to determine at least one road on which the vehicle has traveled;
   calculating, by the processor, a confidence value indicative of the map matching process using the measured uncertainty; and
   producing, by the processor, the traffic congestion index for the at least one road, wherein the traffic congestion index is produced by taking into account the calculated confidence value indicative of the map matching process and the measured uncertainty.

2. The method of claim 1, further comprising outputting, by the processor, the traffic congestion index.

3. The method of claim 1, wherein the dividing produces at least a first variable sliding window having a first time span and a second variable sliding window having a second time span, wherein the first time span is different from the second time span.

4. The method of claim 1, wherein the map matching process is performed for each of the plurality of variable sliding windows.

5. The method of claim 1, wherein the calculating the confidence value comprises evaluating for each of the variable sliding windows, for each shape contained therein, an amount of continuity of a trajectory associated with the plurality of GPS data points.

6. The method of claim 1, wherein the calculating the confidence value comprises evaluating for each of the variable sliding windows, for each shape contained therein, an amount of smoothness of a trajectory associated with the plurality of GPS data points.

7. The method of claim 1, wherein the calculating the confidence value comprises evaluating for each of the variable sliding windows, for each shape contained therein, a curve similarity associated with the plurality of GPS data points.

8. The method of claim 7, wherein the curve similarity is calculated relative to a road on a digital map.

9. The method of claim 7, wherein the curve similarity is calculated by determining a Fréchet distance.

10. The method of claim 1, wherein the plurality of GPS data points are obtained from a plurality of probe vehicles.

11. A computer readable storage medium, tangibly embodying a program of instructions executable by the computer for producing an uncertainty-based traffic congestion index, the program of instructions, when executing, performing the following steps:
   obtaining raw GPS data from a GPS receiver associated with a vehicle, the raw data comprising a plurality of GPS data points for tracking the vehicle;
   measuring an uncertainty in processing the raw GPS data by dividing the plurality of GPS data points into a plurality of variable sliding windows, wherein the dividing maximizes an amount of shape information in each of the plurality of variable sliding windows;
   performing a map matching process on the plurality of GPS data points as the GPS data points had been divided by the dividing to match the plurality of GPS data points to a digital map, and to determine at least one road on which the vehicle has traveled;
   calculating a confidence value indicative of the map matching process using the measured uncertainty; and
   producing the traffic congestion index for the at least one road, wherein the traffic congestion index is produced by taking into account the calculated confidence value indicative of the map matching process and the measured uncertainty.

12. The computer readable storage medium of claim 11, wherein the program of instructions, when executing, performs outputting the traffic congestion index.

13. The computer readable storage medium of claim 11, wherein the dividing produces at least a first variable sliding window having a first time span and a second variable sliding window having a second time span, wherein the first time span is different from the second time span.

14. The computer readable storage medium of claim 11, wherein the map matching process is performed for each of the plurality of variable sliding windows.

15. The computer readable storage medium of claim 11, wherein:
the calculating the confidence value comprises evaluating for each of the variable sliding widows, for each shape contained therein, a curve similarity associated with the plurality of GPS data points;
the curve similarity is calculated relative to a road on a digital map; and
the curve similarity is calculated by determining a Fréchet distance.

16. A computer-implemented system for producing an uncertainty-based traffic congestion index, the system comprising:
a processor; and
a memory storing computer readable instructions that, when executed by the processor, implement:
obtaining raw GPS data from a GPS receiver associated with a vehicle, the raw data comprising a plurality of GPS data points for tracking the vehicle;
measuring an uncertainty in processing the raw GPS data by dividing the plurality of GPS data points into a plurality of variable sliding windows, wherein the dividing maximizes an amount of shape information in each of the plurality of variable sliding windows;
performing a map matching process on the plurality of GPS data points as the GPS data points had been divided by the dividing to match the plurality of GPS data points to a digital map, and to determine at least one road on which the vehicle has traveled;
calculating a confidence value indicative of the map matching process using the measured uncertainty;
producing the traffic congestion index, wherein the traffic congestion index is produced by taking into account the calculated confidence value indicative of the map matching process and the measured uncertainty; and
outputting the traffic congestion index.

17. The system of claim 16, wherein the outputting is configured to output the traffic congestion index in the form of a map.

18. The system of claim 16, wherein the dividing produces at least a first variable sliding window having a first time span and a second variable sliding window having a second time span, wherein the first time span is different from the second time span.

19. The system of claim 16, wherein the map matching process is performed for each of the plurality of variable sliding windows.

20. The system of claim 16, wherein the outputting is configured to output the traffic congestion index to at least one of: (a) a display; (b) a hardcopy printer; (c) a data storage device; and (d) any combination thereof.

* * * * *